(12) United States Patent
Dean, Jr. et al.

(10) Patent No.: US 8,025,371 B1
(45) Date of Patent: Sep. 27, 2011

(54) SYSTEM AND METHOD FOR CREATING LIQUID DROPLET IMPACT FORCED COLLAPSE OF LASER NANOPARTICLE NUCLEATED CAVITIES

(75) Inventors: Robert C. Dean, Jr., Norwich, VT (US); R. Glynn Holt, Natick, MA (US); Ronald A. Roy, Mansfield, MA (US)

(73) Assignee: Synergy Innovations, Inc., Lebanon, NH (US)

( * ) Notice: Subject to any disclaimer, the term of this patent is extended or adjusted under 35 U.S.C. 154(b) by 438 days.

(21) Appl. No.: 12/263,901

(22) Filed: Nov. 3, 2008

Related U.S. Application Data

(63) Continuation-in-part of application No. 11/696,491, filed on Apr. 4, 2007, now Pat. No. 7,445,319, and a continuation-in-part of application No. 11/075,833, filed on Feb. 22, 2005, now Pat. No. 7,380,918.

(51) Int. Cl.
*B41J 2/02* (2006.01)
(52) U.S. Cl. ......................................................... 347/72
(58) Field of Classification Search .................... 347/73, 347/74, 75, 76, 77, 80, 81, 82
See application file for complete search history.

(56) References Cited

U.S. PATENT DOCUMENTS

| | | |
|---|---|---|
| 3,983,740 A | 10/1976 | Danel |
| 7,380,918 B2 | 6/2008 | Dean, Jr. et al. |
| 7,445,319 B2 * | 11/2008 | Dean et al. ...................... 347/73 |
| 2005/0135532 A1 | 6/2005 | Taleyarkhan et al. |
| 2005/0243144 A1 | 11/2005 | Dean, Jr. et al. |

OTHER PUBLICATIONS

J.W.S. Rayleigh, "The Theory of Sound," Copyright: 1945, Dover Publications, Inc., NY, NY; pp. 360-375.
A.G. Evans, Y.M. Ito and M. Rosenblatt, "Impact damage thresholds in brittle materials impacted by water drops", May 5, 1980, Journal of Applied Physics, vol. 51; pp. 2473-2482.
Brian K. Canfield, Sami Kujala, Konstantins Jefimovs, Jari Turunen and Martti Kauranen, "Linear and nonlinear optical responses influenced by broken symmetry in an array of gold nanoparticles," Nov. 1, 2004, Optics Express, vol. 12, No. 22., pp. 5418-5423.
Jean-Yves Natoli, Laurent Gallais, Bertrand Bertussi, Annelise During, Mireille Commandré, "Localized pulsed laser interaction with submicronic gold particles embedded in silica: a method for investigating laser damage initiation," Apr. 7, 2003, Optics Express, vol. 11, No. 7, pp. 824-829.
Vladimir Zharov and Dmitri Lapotko, "Photothermal sensing of nanoscale targets," Jan. 2003, Review of Scientific Instruments, vol. 74, No. 1, pp. 785-788.

(Continued)

*Primary Examiner* — Kristal Feggins
(74) *Attorney, Agent, or Firm* — Bourque and Associates, PA

(57) ABSTRACT

A device, method and system for causing a controlled collapse of cavities formed within liquid droplets wherein a pressurized jet comprising a liquid and nanoparticle material produces droplets from the breakup of the jet stream. The liquid droplets may be irradiated with energy to produce and expand cavities formed within the droplets by irradiation of the nanoparticles contained within the droplets or alternatively, a volatile fluid with or without a metal nanoparticle may form the cavity. The droplets are collided with a target to collapse the cavities within the droplets. The irradiating (if provided) and colliding are timed to enhance implosion energy resulting from the cavities' collapse. The implosion energy and the fuel in the cavity may be used to activate and sustain a fusion reaction or from any other purposes.

14 Claims, 3 Drawing Sheets

OTHER PUBLICATIONS

Gereon Hüttmann, Benno Radt, Jesper Serbin, Björn Ingo Lange and Reginald Birngruber, "High Precision Cell Surgery with Nanoparticles?" Medizinisches Laserzentrum Lübeck, Germany; Medical Laser Application, 2002; vol. 17, pp. 9-14.

William C. Moss, Douglas B. Clarke, John W. White and David A. Young, "Sonoluminescence and the prospects for table-top microthermonuclear fusion," Feb. 5, 1996, Physics Letters A, vol. 211, pp. 69-74.

R.P. Taleyarkhan, J.S. Cho, C.D. West, R.T. Lahey, Jr., R.I. Nigmatulin, and R.C. Block, "Additional evidence of nuclear emissions during acoustic cavitation," 2004 The American Physical Society, Physical Review E 69, pp. 036109-1-036109-11.

Caleb H. Farney, Tianming Wu, R. Glynn Holt, Todd W. Murray, and Ronald A. Roy, "Nucleating cavitation from laser-illuminated nanoparticles," Jul. 2005 Acoustical Society of America, pp. 138-143.

Tianming Wu, "Bubble Mediated Focused Ultrasound: Nucleation, Cavitation Dynamics and Lesion Prediction," Dissertation for Boston University—College of Engineering, 2007.

"Bubble Fusion: Silencing the Hype," Published online, Mar. 8, 2006; doi: 10.1038/news060306-1.

"Silicon Atomizer Delivers Precise Control of Droplets," Tech of the Week, Sep. 4, 2005, yet2.com.

R.A. Roy, C.H. Farny, T.Wu, R.G. Holt and W. Murray, "Nucleating Acoustic Cavitation with Optically Heated Nanoparticles," Department of Aerospace and Mechanical Engineering, Boston University, Boston, MA 02215.

* cited by examiner

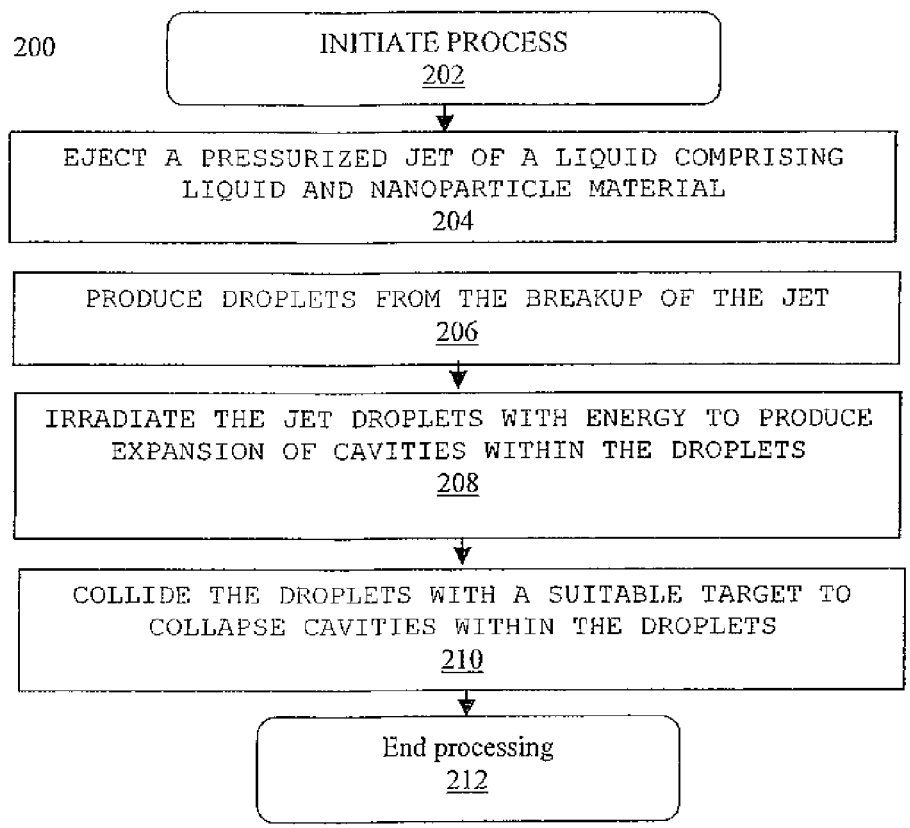

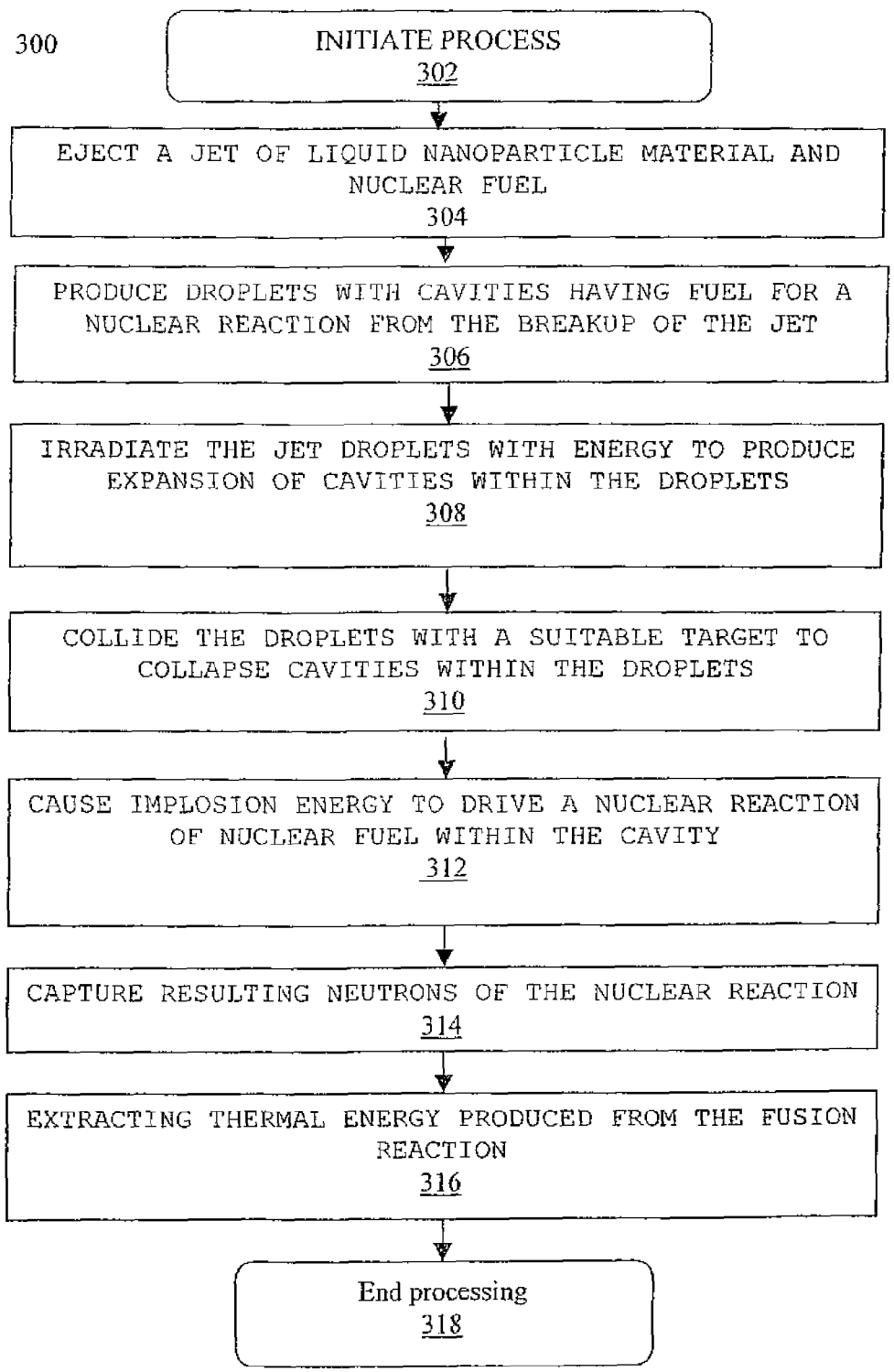

US 8,025,371 B1

SYSTEM AND METHOD FOR CREATING LIQUID DROPLET IMPACT FORCED COLLAPSE OF LASER NANOPARTICLE NUCLEATED CAVITIES

CROSS REFERENCE TO RELATED APPLICATIONS

This application is a continuation-in-part of U.S. patent application Ser. No. 11/696,491, now U.S. Pat. No. 7,445,319 filed Apr. 4, 2007 Entitled "System And Method For Creating Liquid Droplet Impact Forced Collapse Of Laser Nanoparticle Nucleated Cavities For Controlled Nuclear Reactions" which in turn is a continuation-in-part of U.S. patent application Ser. No. 11/075,833 filed Feb. 22, 2005 entitled Method And Apparatus For Forming High-Speed Liquid Droplets which is fully incorporated herein by reference.

TECHNICAL FIELD

The present invention relates to generating and collapsing cavities in liquid droplets and more particularly, relates to utilizing the energy of the collapse.

BACKGROUND INFORMATION

Nuclear fusion describes the class of reactions that combine light atoms (Hydrogen, Deuterium, etc.) to form heavier atoms. For the lightest atoms, the binding energy per nucleon is a sharply increasing function of atomic number owing to the lack of shielding and Coulomb effects. Thus, combining (for example) two Hydrogen atoms to create Helium yields an enormous amount of energy. However, the energy barrier (Coulomb repulsion of the protons) to be overcome as the pre-fusion nucleons are brought closer together is substantial. The barrier is smaller for the heavier isotopes of Hydrogen, Deuterium (a proton and a neutron), and Tritium (a proton and 2 neutrons). Several large government research programs (e.g., U.S. Department of Energy, Oak Ridge National Laboratory; International Thermonuclear Experimental Reactor [ITER]) have been dedicated to achieving the control of fusion reactions on a scale large enough for the eventual purpose of providing relatively clean and abundant energy.

There are two major approaches (with each possessing several offspring which differ in the details) to achieving controlled sustained nuclear fusion, their difference hinging on the method of confinement of the high-temperature, high-pressure and highly-ionized reaction volume (the so-called 'plasma' state). Inertial confinement fusion relies on high-power lasers impinging on a target capsule, some portion of which ablates and yields an imploding shock wave inside the fuel portion of the capsule. Magnetic confinement fusion relies on strong dynamic magnetic fields to confine and compress the reaction volume. Both approaches have been explored (with large-scale government sponsorship) for the better part of 50 years, at least in the United States. Large fixed facilities exist and are being planned in the United States, England, France and Japan, among other countries. To date, the most spectacular result from any of these programs is the achievement of controlled fusion reactions. No net energy has been proven to be harvested from any of these approaches, though sustained nuclear reactions (specifically D-T fusion) have been achieved for as long as 5 seconds.

Collapsing Cavities

Collapsing spherical cavities can achieve high cavity wall velocities, high internal pressures and high temperatures. Many of the designs for the earliest fission bombs employed spherical implosion of the shock waves generated by spherical shaped charges of conventional explosives. Fusion bombs, in turn, utilized in many instances spherical implosion of the shock wave from a fission explosion. In these cases the generic mechanism is inertial confinement.

The preceding examples, while illustrating the usefulness of the concept of spherical implosion for energy focusing, also illustrate the problem of control and yield of such reactions. First, the energy generated by the implosion must be well in excess of the required energies for initiating the fusion reactions. Estimates for the required input temperature (of necessity uncertain to within an order of magnitude depending on fuel mass, density, etc) for sustained nuclear reactions are on the order of $10^7$ K. Assuming such energies are achievable, if the size scale of individual implosions and targets is too large, control is lost. The yield is simply destruction. If, on the other extreme, the scale of individual implosions and targets is very small, control may be achieved, but sustainment and yield are sacrificed. The size scale must be somewhere in between bomb scale (too large) and the atomic scale (too small). As well, the eventual harvesting of useful energy from fusion will require a simple and inexpensive means for sustaining a multiplicity of reaction sites.

If one considers the case of a spherical cavity, filled with a mixture of gas and vapor, and collapsing symmetrically in a liquid, the relevant size scales are one to hundreds of microns for the expanded cavity, and hundreds to tens of nanometers for the collapsed cavity. If spherical symmetry is maintained, then one may estimate the energy available during a free collapse of a cavity. Scaling law analysis for an adiabatic ideal gas (plus some bubble dynamics) yields, for example, that a bubble collapsing from an initial radius of roughly 50 microns, and containing only 0.1% gas volume relative to the equilibrium state at the initial radius, would collapse to roughly 500 nm radius, with an internal temperature on the order of $10^4$ K. If, however, the initial radius of the bubble is increased only by a factor of 2, the resulting temperature is increased an order of magnitude to $10^5$ K.

There are claims in the scientific literature that such cavity collapse has been used to achieve fusion using acoustics to drive the cavity implosion. See for example Taleyarkhan R P, Cho J S, West C D, Lahey R T, Nigmatulin R I, Block R C: *Additional evidence of nuclear emissions during acoustic cavitation*. Physical Review E 2004; 69. While very different from the concept disclosed herein, it is important to note that such acoustic inertial confinement fusion has not won widespread credibility. Furthermore, even granting that nuclear fusion has indeed been achieved as claimed, both power scale-up and size scale-up are intrinsically difficult for acoustic systems, limited as they are by the requirements that the wavelength be much larger than the cavity radius, and by inherent nonlinear acoustic propagation saturation as power input to the transducers increases.

Droplet Impact and Droplets with Cavities

The formation and use of streams of liquid propelled by very high pressure to very high speeds is well known in the industry. Such streams are used, for example, for cleaning surfaces of dirt, contaminants and rust and for removing coatings such as paint. Some researchers have noted that non-steady streams are more effective than steady streams for these applications. In non-steady applications, the stream is broken up into slugs or drops. See, for example, U.S. Pat. No. 3,983,740 incorporated herein by reference.

The prior art in this area of technology has suffered from several drawbacks including, but not limited to, the need to use a complex driver, such as a high frequency ultrasonic generator, or the like, for causing formation of the slugs or droplets. Further, without a driver, other prior art devices are unsuitable for this application due to the fact that the distance required for a stream of liquid to break up into droplets is so long that the stream atomizes to a mist instead of forming droplets.

A considerable amount of pressure and/or heat may be induced by the impact of high-speed liquid droplets (a method for producing such is described below) on hard target surfaces. The original purpose of creating such droplet impact was to deactivate viruses in animal-cell bioreactor harvest liquor for producing parenteral pharmaceuticals.

In order to further increase the internal pressure within the impacting drops, gas-filled cavities have been placed inside the droplets so that the very high implosion pressure of a collapsing cavity would add to the peak pressure of the impact of droplets without cavities. The challenge then became how to create cavities inside the very-high-speed droplets driven by ultra-high pressure in the nozzle plenum chamber. It has been suggested that one means to create cavities of vapor in the droplets is by violently mixing into the water an emulsion of very-small (microns) droplets of liquid propane or butane that is very volatile at 1 bar. The vigorous mixing will saturate the water with the propane at $p_n = p_{mixing}$. The selected liquid state must be above the critical point at the water's plenum pressure.

However, the emulsion technique described above suffers from a lack of control over the timing and size of the resultant cavities, which begin to form from the emulsified phase micro droplets within the host liquid as the pressure decreases when the jet exits the high-pressure nozzle. Further, such cavities contain the entire volume of vaporized volatile compound, and their ensuing collapse may be damped by the cushioning effect of so much vapor in the interior.

SUMMARY

The present invention is a novel device, system, and method for causing the forced collapse of vapor cavities within liquid droplets. The exemplary device may have an injection means for injecting nanoparticles into a liquid or the device may employ a previously-mixed liquid. A plenum and one or more nozzles may eject a jet or a multitude of jets comprising liquid and nanoparticle material. Droplets are produced from the breakup of the jet. In one embodiment, an irradiating device exposes the droplets to electromagnetic waves to produce and expand cavities in the droplets by heating the nanoparticles. The droplets are collided into a suitable (for example, solid) target in order to enhance the collapse of the cavities inside the droplets. The irradiating and colliding are timed to enhance implosion energy of the cavities' collapse. In another embodiment wherein the droplets contain an emulsion of, for example, a volatile fluid, no irradiation is necessary. In yet another embodiment, the droplets contain an emulsion of a volatile fluid and also include a nanoparticle. In this embodiment, irradiation is required to gain the additional benefit of a cavity caused by irradiating the nanoparticle.

In an alternative embodiment, fuel for a nuclear reaction may be introduced into the cavities formed within the droplet. The implosion energy may be harnessed to drive a nuclear reaction within the cavity. The neutrons from the nuclear reaction may be captured and used to provide thermal energy.

It is important to note that the present invention is not intended to be limited to a system or method which must satisfy one or more of any stated objects or features of the invention. It is also important to note that the present invention is not limited to the exemplary or primary embodiments described herein. Modifications and substitutions by one of ordinary skill in the art are considered to be within the scope of the present invention, which is not to be limited except by the allowed claims and their legal equivalents.

BRIEF DESCRIPTION OF THE DRAWINGS

These and other features and advantages of the present invention will be better understood by reading the following detailed description, taken together with the drawings wherein:

FIG. 2 is a flow chart illustrating an exemplary embodiment used for the method causing the forced collapse of cavities in liquid droplets according to the present invention; and FIG. 3 is a flow chart illustrating an exemplary embodiment used for driving a fusion reaction from the collapse of liquid droplets according to the present invention.

DETAILED DESCRIPTION

Figure 1:
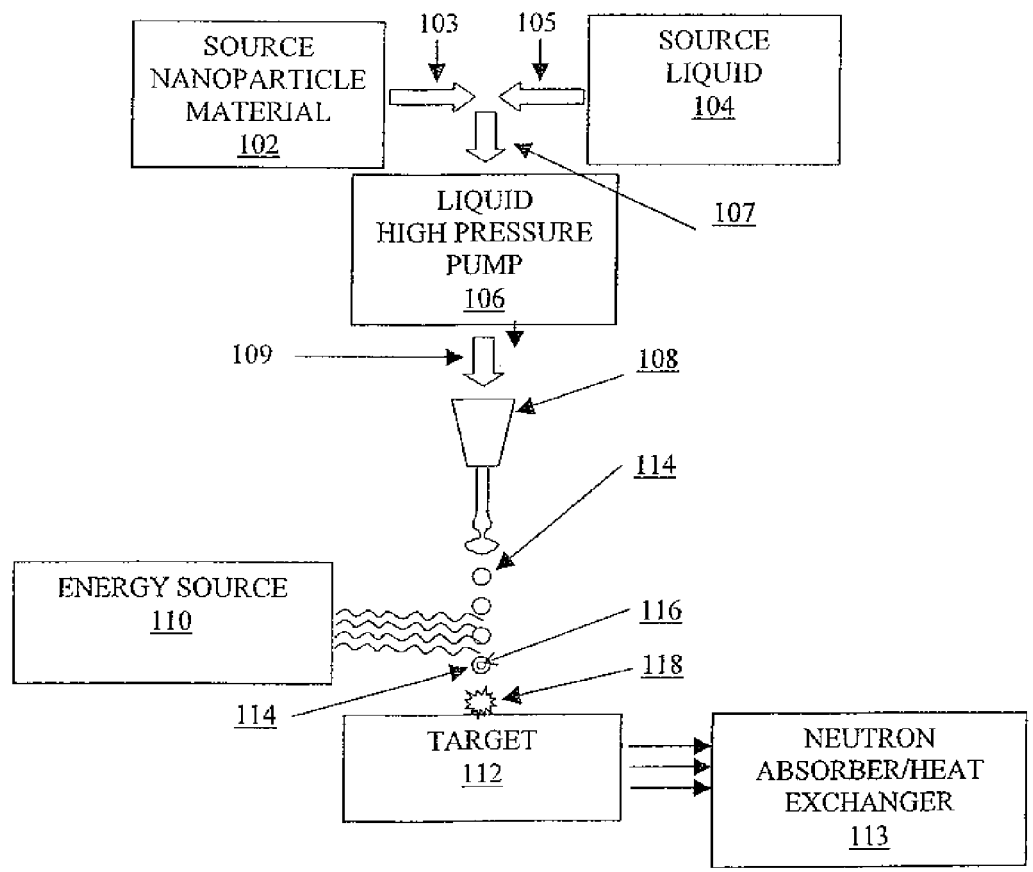
FIG. 1 is a block diagram of an exemplary system used for causing the forced collapse of cavities within liquid droplets according to an exemplary embodiment of the present invention.

The invention disclosed herein rests in the union of two different technologies. The first technology relates to creating temporally, spatially and energetically controlled cavities in a liquid. The second technology relates to creating small, high-velocity droplets as disclosed, for example, in co-pending U.S. patent application Ser. No. 11/075,833 incorporated fully herein by reference. By combining these two technologies, cavities can be induced in high-velocity droplets with precise timing of their inception and expansion to a preferred radius. Upon impact of these cavity-containing droplets with a target, strong compressional waves are created which then rapidly propagate into the interior of the drop. Rapid inertial collapse of a cavity will be forced by the great positive pressure rise across the compressional wave, driving the cavity to collapse more violently than it would naturally. With suitable materials comprising the contents of the cavity, the energy during the cavity collapse may be harnessed to drive, for example, a nuclear fusion reaction. Droplet impact rates in excess of 1 MHz from a single jet can be augmented by multiple jets from nozzle arrays. Since each droplet may contain multiple cavities, scaleup should be achieved easily. A technical description of each step of the process is now disclosed herein.

Droplet Creation

Referring to FIGS. 1, 2, and 3, an example of a droplet creation system 100 which may be used to practice the present invention is described in greater detail in U.S. patent application Ser. No. 11/075,833, titled "Method and Apparatus for Forming High-Speed Liquid Droplets" to R. C. Dean, Jr. et al.

An exemplary embodiment of the invention provides a method for creating and controlling cavities within droplets (block 202, 302) produced by, for example, the droplet creation and excitation device of U.S. patent application Ser. No. 11/075,833 titled "Method and Apparatus for Forming High-Speed Liquid Droplets" incorporated herein by reference. A nanoparticle material source 102 provides a source of nanoparticle material 103 (nanoparticles supplied in a liquid suspension that is mixed in before the water is compressed. They are 10-100 nm in diameter and shaped in any form, regular or irregular, can be gold or other material which is then mixed with a liquid stream 105 from liquid source 104 (block 204, 304) to provide a mixed liquid stream 107 including the nanoparticles.

One or more high-velocity liquid jets (typically 50-1000 diameter, traveling at velocities between 500-1500 m/s) are ejected from a plenum chamber 108 at a pressure of 20 ksi (140 MPa)-180 ksi (1.3 GPa). These liquid pressures can be created by known ultra-high-pressure pumps 106, for example from Flow International, Inc., or created by pressure intensifiers driven by an electric motor or an internal-combustion engine (e.g., diesel). The high-pressure liquid containing nanoparticles is provided to a plenum and nozzle(s) 108. The number of nozzles 108 operating in parallel may range from 1-5000 or more. Their orifice diameter may range from 1-1000 μm or more. After the jets leave the nozzle(s) 108, the jet is caused to separate into a train of droplets 114 by the well known Rayleigh jet-instability phenomenon (block 206, 306). See J. W. S. Rayleigh, Lord, The Theory of Sound, (Dover, N.Y., 1945). The droplets 114 so formed are approximately twice the diameter of the jet and are spaced approximately four jet diameters apart. When these droplets 114 strike a suitable (for example, solid) surface 112, the droplets 114 can produce peak pressures on the impacted substrate of 10-20 times the pressure in the plenum chamber feeding the jet nozzles 108 (block 206, 306). The droplets' impact 118 produces a compression wave inside the droplet 114, whose peak pressures may be on the same order as the peak pressures on the impacted substrate.

In a particular case, the plenum pressure in the plenum 108 was 25 ksi (170 MPa) producing jets with a velocity of 580 m/s and droplets 114 ~150 μm diameter formed from a ~75 μm diameter jet. The drop-passing frequency was ~1 MHz, which is the frequency at which the droplets from a single jet impact on the substrate. The peak pressure produced, according to Rosenblatt et al. numerical analysis, was ~15 times the nozzle plenum pressure; that is, 375 ksi (2.6 GPa). See A. G. Evans, Y. M. Ito and M. Rosenblatt, Journal of Applied Physics, 51, 2473 (1980). That pressure has proven to be high enough to excavate material from a steel substrate such as an aircraft-carrier's deck.

Laser-Excited-Nanoparticle Nucleation of Cavities

As previously discussed, very high pressures may theoretically be achieved inside pre-existing vapor/gas cavities driven to collapse by a compressive pressure wave. The only prior technique for creating such cavities (superheated emulsions) suffers from lack of control and by itself may cushion the collapse. What is required is a reliable means for nucleating the right number density of gas/vapor cavities of the right size and at the right instant in time such that they are optimally susceptible to driven collapse by the compression wave generated from droplet impact on the target. In this subsection, a method for such controlled nucleation is introduced. The interaction of an energy source 110, for example, a laser source, with micro- and nanometer sized particles, has received much recent attention in such diverse fields as optics (See Canfield B K, Kujala S, Jefimovs K, Turunen J, Kauranen M: Linear and nonlinear optical responses influenced by broken symmetry in an array of gold nanoparticles. Optics Express 2004; 12:5418-5423), non-destructive testing (See Natoli J-Y, Gallais L, Bertussi B, During A, Commandre M: Localized pulsed laser interaction with submicronic gold particles embedded in silica: a method for investigating laser damage initiation. Optics Express 2003; 11:824-829), bio-medical imaging (See Zharov V, Lapotko D: Photothermal sensing of nanoscale targets. Review of Scientific Instruments 2003; 74:785-788) and various medical treatment scenarios involving selective cell death (See Hüttmann G, Radt B, Serbin J, Lange B I, Birngruber R: "High precision cell surgery with nanoparticles?" Medical Laser Application 2002; 17:9-14). 15 nm gold particles [Hüttmann et al., 2002], and 250 nm, 100 nm, 40 nm 10 nm and 2 nm gold particles have all exhibited microbubble cavity formation in suspensions of cells when irradiated by visible laser pulses.

Experiments conducted in gels have shown that the combination of lasers, nanoparticles and acoustics can lower the threshold for inertial cavitation. For a given acoustic pressure, the laser intensity required to nucleate and achieve inertial cavitation is reduced by almost two orders of magnitude relative to the laser/nanoparticle only case; conversely, for a given minimal laser pulse intensity, the acoustic pressure required to yield inertial cavitation in the gel is smaller by a factor of roughly five (Farny C, Wu T, Holt R, Murray T and Roy R, "Nucleating cavitation from laser-illuminated nanoparticles", Acoustics Research Letters Online 2005; 6:138-143)

The process by which cavities are created is provided in general herein for exemplary purposes. A theoretical model describing the process of cavity creation may be found in Wu T, "Bubble mediated focused ultrasound: nucleation, cavitation dynamics and lesion prediction", PhD Thesis, Boston University, Department of Aerospace and Mechanical Engineering, June, 2006. A short pulse (ps to ns duration) of light (typically laser light in the visible spectrum) from the light energy source 110 is caused to be incident on metal particles (nanoparticles contained in the liquid droplet) having a radius $R_s$ such that the optical size parameter $kR_s$ is of order 0.1 to 1; here $k=\omega/c$ is the optical wave number where $\omega$=frequency [radians/sec], c=speed of light. Broadly resonant absorption causes rapid heating of the particles, which in turn rapidly heats the liquid surrounding the sphere. A thin layer of liquid superheats around the sphere, eventually forming a vapor blanket. Above a threshold laser intensity, explosive vaporization may occur, leading to the formation of a cavity 116 within the droplet 114 roughly 100 times the initial size of the nanoparticle 103. For example, computations show that using a 532 nm incident laser pulse of 5 ns duration and as little as 150 mJ/cm$^2$ energy flux, a water vapor cavity with expansion of 100× may be achieved for a gold sphere of roughly 50 nm radius. Increasing the laser energy increases the expansion of the resulting cavity 116.

Although the present invention is described in connection with using optical energy (a laser) as the energy source to heat, form and expand the droplet cavity, this is not a limitation of the present invention. For example, energy source 110 may include any type of oscillatory energy source such as electrical energy as might be found for example in radio wave and microwave applications and magnetic energy such as might be provided by a fluctuating magnetic field. For example, a fluctuating magnetic field may heat small conducting particles in the droplet.

Once this explosive vaporization and subsequent cavity expansion occurs, the interior of the cavity cools, and the cavity 116, which consists of mostly vapor and a little gas, begins to collapse freely (block 210, 310), that is, the collapse is driven by the static pressure difference across the cavity wall. The collapse at the impact point 118 of such a cavity 116 is rapid, with final velocities approaching the liquid sound speed. Such collapses at impact point 118 are driven by the surrounding liquid pressure and by the inertia of the inrushing liquid, and the cavities 116 which exhibit such collapses are conventionally termed inertial cavities. Rayleigh was the first to consider the collapse of a void in a liquid, and one may show that even such laser-nanoparticle-nucleated cavities collapse as Rayleigh cavities until the very end of their lifetime (block 212, 312).

Energy Yield from Cavity Nucleation Inside Impacting Drops.

The free collapses of laser nucleated cavities are not violent enough to result in fusion. However, the added contribution of a strong compressional wave inside impacting droplets, precisely timed to coincide with the initial stages of the otherwise free cavity collapse, can yield the necessary collapse energy, in the following way. Consider a single droplet containing a nanoparticle at some instant traveling toward a target. A laser pulse is caused to be incident on the droplet at this same instant, nucleating a cavity, which grows to roughly 100 times the cavity's initial size in some time in the order 100's of ns. During the time between the laser pulse and impact, the cavity 116 should grow to the cavity's maximum size and have just begun collapsing, so that the arrival time of the impact pressure wave on the cavity 116 coincides with the beginning of its collapse phase. The cavity collapse energy at impact point 118 is greatly enhanced by the strong impulsive compressional wave and the resulting peak internal pressure and temperature may exceed that required for fusion reactions of the fuel material inside the cavity.

Control and timing are necessary to optimize the collapse energy 118. Bubble dynamics simulations show that there is an optimal time for the arrival of an impulsive pressure wave (compression wave) in order to maximize the collapse 118 velocity and thus the compression and heating of the cavity contents. See Moss W C, Clarke D B, White J W, Young D A: Sonoluminescence and the prospects for table-top microthermonuclear fusion. Physics Letters A 1996; 211:69-74. Thus, the impact of the droplet on a suitable target 112, which produces the compression wave to drive the cavity collapse, must occur at some precise time relative to the evolving radius of the cavity.

In turn, the need for controlled compression wave arrival implies that precise control of the cavity nucleation time must be achieved. Such control is afforded by using laser radiation (either pulsed or CW) incident on the droplets in conjunction with metal nanoparticles suspended in the host droplet liquid. The rapid (ns) heating of the nanoparticles leading to vapor formation can be timed either by timing the laser pulse relative to the droplet formation at a fixed spatial location, or by varying the spatial location of a CW laser beam along the droplet velocity axis. The length of the droplet axis can be extended to meters, if necessary (see U.S. patent application Ser. No. 11/075,833). The laser energy density will determine the maximum radius of the resultant cavity. A specific combination of droplet size, droplet velocity and laser energy may optimize the collapse energy.

Fuel Concepts

Thus far, the embodiments disclosed herein teach the ability to achieve cavity collapse energies at impact point 118 far in excess of those achievable by passive collapse. Referring to FIG. 3, the next embodiments harness the collapse energy for nuclear fusion reactions to occur (block 312). Though there are variants, the most common and lowest energy reactions are:

$$D+T \rightarrow {}^4He(3.56\ MeV)+n(14.03\ MeV) \quad (1)$$

$$D+D \rightarrow {}^3He(0.82\ MeV)+n(2.45\ MeV) \quad (2)$$

$$D+D \rightarrow T(1.01\ MeV)+p(3.02\ MeV) \quad (3)$$

$$D+{}^3He \rightarrow {}^4He(3.6\ MeV)+p(14.7\ MeV) \quad (4)$$

where D is Deuterium, T is Tritium, n is neutron and p is proton, and the recoil kinetic energies for each constituent are given in parentheses. The reaction with the highest reactivity for achievable plasma temperatures is by far the D–T reaction (1), followed by the D–D pair (2), (3). Thus, embodiments may utilize fuels resulting in both D–T and D–D reactions.

Below are a few embodiment variations for inclusion of the nuclear fuel that may be useful and optimizable (block 304).

1. Droplet material as fuel. In this embodiment, the droplet host liquid vapor itself serves as the fuel. The cavity 116 created by the Method described above may contain some amount of the host liquid vapor determined by the laser energy, the material characteristics (vapor pressure, surface tension, viscosity) of the liquid source 104, the nanoparticle 102 size and the droplet 114 size. Thus in this simplest of cases, the source liquid 104 may itself be or contain fusible material. Deuterated water (so-called heavy water) is one candidate. Deuterated solvents (easily obtained because of their usage in liquid chromatography) may be advantageous because of the possibility of minimizing collapse cushioning by the choice of a very low vapor pressure liquid such as deuterated toluene. Upon cavity collapse, some portion of the vapor inside the cavity may undergo nuclear reactions.

2. Fuel as dissolved gas in host drop. In this embodiment, the droplet liquid 104 used is a low vapor pressure material into which a small amount of deuterium or deuterium/tritium gas has been dissolved. Upon cavity 116 formation and expansion, the dissolved fuel gas will diffuse into the cavity 114, a portion thereof reacting upon collapse 118. Water may be used as the source liquid 104, although other fluids may be utilized without departing from the scope of the present invention.

3. Nanoparticle as fuel carrier. This embodiment uses either hollow or porous metal nanoparticles 102 enclosing or embedding deuterium or deuterium/tritium gas. Utilizing a low vapor pressure droplet host, the collapse 118 of the resulting cavity converges on the nanoparticle, possibly initiating a secondary converging compression wave within the particle itself.

4. A combination of the above embodiments 1-3. It may be advantageous to combine any of the above embodiments or portion of the above embodiments. For example, more violent collapses 118 may be achieved by utilizing a low vapor pressure deuterated liquid source 104 in combination with hollow T or D–T containing nanospheres 102.

Energy Extraction Concepts

Once nuclear fusion reactions and/or self-sustaining fusion reactions have been achieved (block 312), the resultant energy from the nuclear reaction may then be harnessed. The reaction embodiments (1,2) above show that the majority of the energy may be carried away as kinetic energy by the neutron produced. An embodiment utilized in traditional laser Inertial Confinement Fusion (ICF) may be that of a metal 'blanket' surrounding the reaction area, which will trap the neutrons, converting their kinetic energy to thermal energy (block 314), which can then be used to produce steam (block 316), which in turn may be conventionally converted to electricity via technologies known to one skilled in the art (block 318). We may divide the energy extraction concepts into two additional embodiments. In the first embodiment, the impact target itself serves also as the neutron absorber/heat exchange medium. In the second embodiment, the neutron absorber/heat exchanger 113 may be some distance away from the droplet impact reaction site (1 m or more) on the solid target 112.

Combination Impact Target/Neutron Absorber/Heat Exchanger:

1. Cylindrical cap impact target: Above was described how the high-velocity droplets must impact a suitable and suitably hard target 112 in order to produce the compression wave that drives the cavity collapse. But the 'hard' impact target need not be a plane except for the area on which the droplets impact. A right-circular cylinder with a hole bored along the axis to provide an entry point for the droplet nozzle 108 and containing a target may, if made out of high density metal such as stainless steel, provide both containment and heat transfer, ultimately to a flowing coolant loop. The impact target may be stationary or moving either in a translational (left/right and/or up/down) manner or in a rotating manner. The target or target surface may also include ice or other frozen liquid, sulfur, wax, polymer coatings with or without solid inclusions, self-healing materials like silicone rubber and collagen gel, solid particles coated on and held on a rotating disk by physical or magnetic or electrical forces, and flaked material including metals, clays or graphite.

2. Flowing impact target: The 'hard' impact target 112 may not be a solid—the impact target 112 may be a liquid. If a liquid metal, for example mercury, were in continuous flow, the surface could be impacted by the drops, producing the required compression wave in the drops. The flowing mercury may then also provide the desired neutron capture, heating up the mercury. The energy thus transferred could then be extracted and converted to electricity or other forms of energy via technologies known to one skilled in the art. There are also generally effective, less expensive and far less toxic liquid metals such as, but not limited to, Sn, Al, Cu, Li, Hg, Gd, Bi, Pb and Zn and alloys of these and others.

While mercury has a modest neutron capture cross-section, gadolinium, for example, has a very high cross-section. Moreover, gadolinium has been used as a suspension in solution to provide MRI contrast. It is envisioned that a suspension of Gd in a host working liquid could provide an ideal combination of heat conduction properties and (very) high neutron capture cross-section. The liquid metal is not consumed.

In addition, other liquid metal equivalents are contemplated by the present invention including but not limited to ice or other frozen liquid like liquid metal, sulfur, wax, polymer coatings with or without solid inclusions, self-healing materials like silicone rubber and collagen gel, solid particles coated on and held on by physical magnetic rotating disk or electrical forces, and flaked material like metal, clays or graphite.

3. Low absorption impact target/distant neutron absorber: if, as is deemed likely for laser ICF, nearby metal objects may be destroyed by too rapid absorption of high energy neutrons, the impact target itself may not be used as a neutron absorber/heat exchanger. Therefore, a more distant (1 m or more) neutron absorber/heat exchanger may be employed. Very likely that absorber may be, for example, either solid stainless steel, or a steel container filled with flowing liquid absorber such as the Gd suspension discussed above. In this latter case, the impact target itself may have to be either self-repairing, or rapidly exchangeable and inexpensive (recall MHz droplet impact rates may be achieved).

4. Self-repairing impact target: The flowing impact solid target 112 described above may be employed in this context as a self-repairing impact target. In this case, however, the impact solid target 112 liquid may be chosen to have a small neutron absorption cross-section, in order to minimize heating, and in order to allow the neutrons to travel to the distant absorber.

5. Rotating impact target: A rotating impact target 112 may also be employed in this case, enabling fresh surfaces to be impacted by each new drop. Again, in this embodiment, the impact target material may be chosen to have a low neutron capture cross-section. The target may also rotate through some "bath" or material to "re-coat" or "rejuvenate" its impact surface.

6. Colliding drops: The energy of impact may be doubled by having opposing, identical droplets impact each other. However, the physical events inside each drop is unchanged from a drop impacting on a stationary target. Such a colliding droplet train scheme may be achieved with two nozzles, or even multiple colliding droplet trains with opposing aligned spray heads. Impact timing (thus impact location) could be achieved by simple translation along the jet axis, and in any case would be uncertain to within no more than +/−4 times the average droplet spacing. Since the droplets will be destroyed in any event, this drop-as-impact-target scheme relieves the need for target changeout. Colliding droplets may be part of a distant neutron absorber embodiment, but could also be utilized with the droplets themselves as absorbers. Heavy-liquid drops would be preferred as absorbers.

7. Multiplicity of liquid jets: To ultimately achieve the goals of break-even and scale-up, multiple droplet-creating liquid jets may be employed, each containing nanoparticle nuclei for cavity creation, a means for the electromagnetic irradiation of each jet and a suitable fuel/impact target scheme for each jet. Millions of such jets in a single device may be required for a large commercial power plant using multiple nozzles 108 per spray head and multiple spray heads per pump, and finally multiple pump operations.

In another embodiment, the present invention contemplates providing an emulsion of water and a volatile fluid such as liquid benzene, ethylene or the like. The liquid volatile fluid and water are mixed at high-pressure. At an elevated temperature, the volatile fluid converts to a liquid which can be mixed with the water. The mixing can be done using a propeller, a pressure means or an ultrasonic emulsifier/homogenizer. The volatile fluid will turn into a gas and evaporate upon leaving the jet nozzle causing a cavity within the water droplet. In this embodiment, the droplet may not require irradiation by a laser. The use of very-superheated, cavity-inducing, "volitile" (i.e. liquid with lower boiling temperature than the drop liquid (water or the like), alone or as submicron drops with a nanoparticle inside each to initiate cavity expansion as soon as the pressure drops is contemplated.

The acceleration time thru the sharp-edged orifices that are contemplatede is 10 s nanoseconds. A velocity & streamline plot by Fluent can be sent at 750 m/s, in which case the water Mach number is 0.5. If the water is compressed to >200 MPa, it should not cavitate because all of the gas in motes is driven into solution according. Then, will the cavity-forming, volitile, submicron drops inside the water drops change phase. They will be more superheated than the water, but that will not provide gas cavities. However, the gas in the nanoparticle may behave differently from a water estimate because the volatile liquid to its gas surface tension will be different and the crevices might be unusual (i.e. smaller radius than 2 nm). We can go now to 87 ksi [735 MPa] and 1100 m/s, giving 1.85× the shock-rise pressure with a commercial, constant-flow pump (Flow International). Probably, later on, to 150 ksi, continuous flow with a special design. If adequate timing can be provided by the pressure drop, then that issue goes away. A million jets will yield 1-3 trillion/second impacts. The flight time from orifice to target can be held to 10 s ns. This will likely be adequate precision to shock each cavity at its rippest time in order to maximize implosion pressure.

In yet another embodiment, a metallic nanoparticle may be included with or without a volatile fluid to enhance the creation of a gas pocket which, when it collapses under pressure, produces high temperatures. As previously described, the use of a metallic nanoparticle requires the use of a laser or other similar irradiation to create and/or enhance the gas bubble within the liquid particle. For purposes of this application, a nanoparticle is intended to mean a minute particle of solid, liquid or gas.

Collapsing gas bubbles within the water droplets created as described herein can be used to generate neutrons which have many useful purposes including: 1) for imaging (often termed low energy neutron diffraction imaging); 2) heating liquids (a shock wave of the droplets impacting a solid surface generates heat which is then used to heat a liquid; 3) chemical reactions engendered by the impact of the liquid droplets creating high temperatures and pressures; 4) a cutting device caused by the exploding nanoparticles; 5) a weapon (2 different types of reactants are mixed into the liquid droplet which are then ignited by the shock waves of the particles striking a solid surface thereby creating upwards of 200,000 bars of explosive pressure; 6) a chemical reaction weapon caused by fission; 7) as a portable and compact neutron source for generating bursts of neutrons for medical applications and focusing the neutrons for medical applications internal or external to the body (for example, for creating neutrons that will stop in a tumor which has been injected with a particular material thereby insuring that only the subject tumor will receive the neutrons); 8) for waste and wastewater treatment purposes for killing bacteria and other undesirable elements; 9) for purifying and/or sterilizing liquids by making liquid drops with cavities and impacting the against a surface which causes the high-pressure wave to kill any virus; 10) for working the surface of a material to replace "shot peening" the surface for material working and strain hardening the surface including the removal of Rust and paint, surface profiling, removing lead paint and the like; 11) for serving as needle-less tattooer; 12) for serving to remove tattoos; 13) for surface or subsurface delivery of matter including, for example, transdermal medical drug delivery; 14) in dental applications for excavation and implantation; 15) for injecting poisonous chemicals into wood to protect it against bugs and rot; and 16) for injecting drugs into live trees.

Modifications and substitutions by one of ordinary skill in the art are considered to be within the scope of the present invention, which is not to be limited except by the allowed claims and their legal equivalents.

The invention claimed is:

1. A method for causing forced collapse of cavities in liquid droplets containing nanoparticles comprised of a minute portion of solid, liquid or gas, comprising the acts of:
   producing at least one pressurized liquid jet stream comprising a liquid and nanoparticle material;
   causing the break up of said at least one pressurized liquid jet stream comprising a liquid and nanoparticle material producing a plurality of droplets containing liquid and nanoparticle material from the breakup of the jet stream, said plurality of droplets containing liquid and nanoparticle material including a nano-cavity within each of the plurality of droplets; and
   causing the nano-cavity containing droplets to collide with a target to collapse the nano-cavities within the droplets.

2. The method of claim 1 wherein said nanoparticle is a superheated nano droplet containing an immiscible fluid.

3. The method of claim 1 wherein said nano droplet further includes a metallic nanoparticle inside said droplet.

4. The method of claim 3, further including the act of irradiating the droplets with energy to produce expansion of cavities within the droplets causes said metallic nanoparticle in said droplets to absorb said irradiated energy.

5. A method of claim 4, wherein said method further comprises:
   controlling the radius of the cavities prior to collapse by regulating the energy density of the irradiating energy absorbed by the metallic nanoparticle material and the time from irradiation to droplet collision.

6. The method for forced collapse of cavities in liquid droplets of claim 4 wherein the irradiating energy includes photons.

7. The method of claim 6 wherein said energy includes laser light energy.

8. The method for forced collapse of cavities in liquid droplets of claim 1 wherein the temperature at the epicenter of the cavities' collapse causes at least one nucleus fusion reaction.

9. The method for forced collapse of cavities in liquid droplets of claim 8 wherein the liquid metal includes mercury.

10. The method for forced collapse of cavities in liquid droplets of claim 8 wherein the liquid metal is selected from the group consisting of Sn, Al, Cu, Li, Hg, Gd, Bi, Pb and Zn and alloys of this group.

11. The method for forced collapse of cavities in liquid droplets of claim 1 wherein the plurality of droplets are a serial stream of droplets.

12. The method for forced collapse of cavities in liquid droplets of claim 1 wherein the target is a liquid metal.

13. The method for forced collapse of cavities in liquid droplets of claim 1 wherein the target is selected from the group consisting of ice or other frozen liquid, sulfur, wax, polymer coatings with or without solid inclusions, self-healing materials like silicone rubber and collagen gel, solid particles coated on and held on a rotating disk by physical or magnetic or electrical forces, and flaked material including metals, clays or graphite.

14. The method of claim 1, wherein said forced collapse of cavities in liquid droplets containing nanoparticles comprised of a minute portion of solid, liquid and/or gas are used for a purpose selected from the group consisting of: low energy neutron diffraction imaging; heating liquids; causing chemical reactions engendered by the impact of the liquid droplets creating high temperatures and pressures; a cutting device caused by the exploding nanoparticles; a weapon (2 different types of reactants are mixed into the liquid droplet which are then ignited by the shock waves of the particles striking a solid surface; a chemical reaction weapon caused by fission; a portable and compact neutron source for generating bursts of neutrons for medical applications and focusing the neutrons for medical applications internal or external to the body;

for waste and wastewater treatment purposes for killing bacteria and other undesirable elements; for purifying and/or sterilizing liquids by making liquid drops with cavities and impacting them against a surface which causes the high-pressure wave to kill any virus; for working the surface of a material to replace "shot peening" the surface for material working and strain hardening the surface including the removal of rust and paint, surface profiling, and removing lead paint; for serving as needle-less tattooer; for serving to remove tattoos; for surface or subsurface delivery of matter including, for example, transdermal medical drug delivery; for dental applications for excavation and implantation; for injecting poisonous chemicals into wood to protect it against bugs and rot; and for injecting drugs into live trees.

* * * * *